Dec. 10, 1968 O. W. MEMELINK ET AL 3,416,008
STORAGE CIRCUIT EMPLOYING CROSS-CONNECTED OPPOSITE CONDUCTIVITY TYPE INSULATED-GATE FIELD-EFFECT TRANSISTORS
Filed Sept. 29, 1964
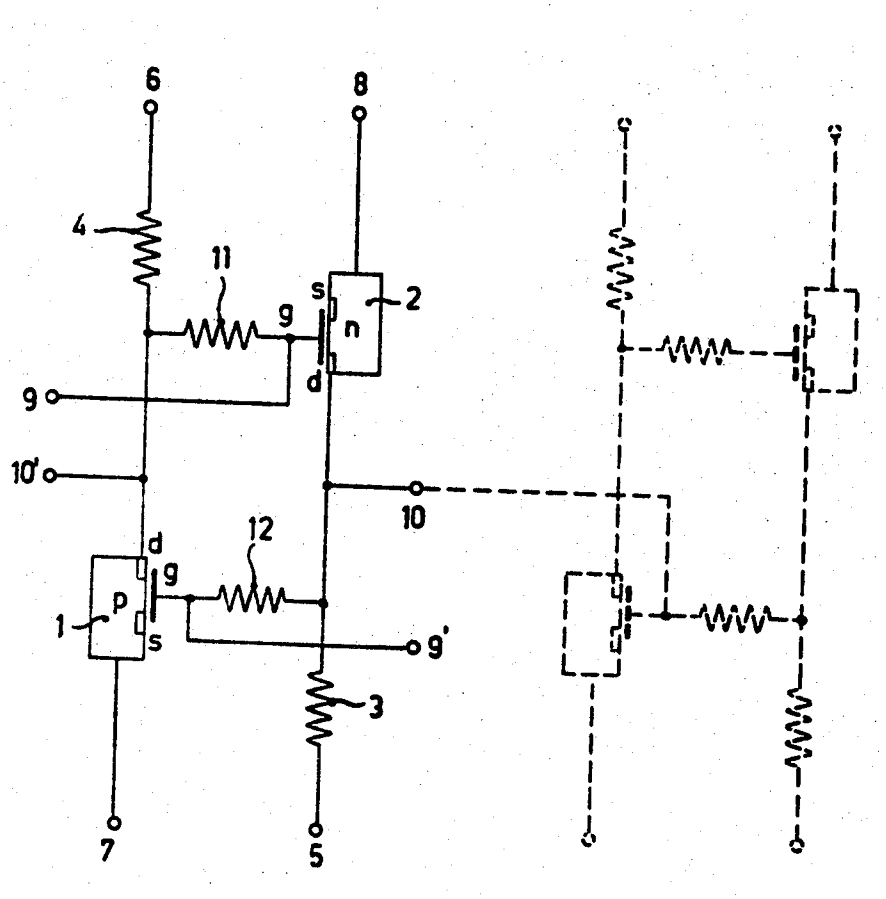
INVENTORS
OSCAR W. MEMELINK &
JOHANNES MEYER CLUWEN
BY
Frank R. Trifari
AGENT

1

3,416,008

STORAGE CIRCUIT EMPLOYING CROSS-CONNECTED OPPOSITE CONDUCTIVITY TYPE INSULATED-GATE FIELD-EFFECT TRANSISTORS

Oscar Willem Memelink and Johannes Meyer Cluwen, Emmasingel, Eindhoven, Netherlands, assignors to North American Philips Company, Inc., New York, N.Y., a corporation of Delaware Filed Sept. 29, 1964, Ser. No. 400,155
Claims priority, application Netherlands, Oct. 1, 1963, 298,671
3 Claims. (Cl. 307—279)

ABSTRACT OF THE DISCLOSURE

A storage circuit is constructed with two cross coupled field effect transistors having their control electrodes connected through high resistivity resistors to the terminals of a supply source. The polarity of the source biases the control electrodes in the cut-off direction. The source electrodes are connected to voltage points having a potential difference less than the supply source voltage. The output is derived from one of the cross coupled connections.

This invention relates to storage circuits including two transistors of complementary type and having their control and output electrodes cross-coupled. Known devices of this kind utilize junction transistors, one of the npn-type and the other of the pnp-type, the collectors and bases of which are cross-coupled to one another so that the combination may be in a condition of comparatively high-resistance or in a condition of comparatively low resistance for a voltage applied between the emitters. The device then operates as a trigger and passes only a comparatively low current in the first-mentioned condition, but a comparatively high current in the last-mentioned condition.

This property of passing high currents is a great disadvantage for devices utilizing many thousands of storage elements, such as in computer and automatic telephone installations, because of the high consumption of energy and the heat developed. Consequently such installations frequently utilize storage cores, usually small rings of ferromagnetic material having a rectangular magnetization curve, the state of residual magnetization of which constitutes the storage characteristic. Such storage cores need no permanent consumption of current, only a current pulse of sufficiently large amplitude having to be used for switching over from one state of magnetization to the other. The above-mentioned disadvantages regarding energy consumption and heat development exist therefore to a much lesser extent for storage cores. However, the current pulses obtained upon reading are usually too weak for the control of subsequent storage cores.

It is an object of the invention to provide a transistorized storage device in which the current consumption, irrespective of the storage condition of the device, is also very low. However, it affords the additional advantage over magnetic stores that amplified currents may be supplied. Such storage devices, which are based on accumulation phenomena (storage) in the base zone of the transistor, are known but have the disadvantage that the accumulation charge soon leaks away, often in a fraction of a second, so that the storage condition is not a permanent one.

2

The present invention is characterized in that transistors of the field-effect type are used. Their control electrodes are connected through high-resistivity resistors to the terminals of a supply source which biases the control electrodes in the cut-off direction. Their source electrodes are connected to voltage points, the difference of which is smaller than the voltage of the supply source, and the output signal is derived from at least one of the cross-connections.

In order that the invention may be readily carried into effect, it will now be described in detail, by way of example, with reference to the accompanying diagrammatic drawing.

The figure shows two field-effect transistors 1 and 2 of the type having insulated gate or control electrodes. Such a field-effect transistor fundamentally comprises a semiconductor body of one conductivity type, for example p-type, for example a silicon crystal in which zones of the opposite conductivity type (n-type) are provided. An insulating layer, notably an oxide film, which is covered with a metallic electrode, is applied to the surface of the semiconductor body on the side of these zones and partly overlap these zones. By applying a voltage difference between electrodes connected to the zones (which electrodes will be referred to as source and drain electrodes) current will flow only if a voltage applied to the said metallic electrode (referred to as control electrode) pulls the minority charge carriers from the crystal body (i.e. electrons in this example) to the surface of the crystal body and brings about in situ surface conduction. In the present example the control voltage must therefore be positive with respect to the source electrode and the drain electrode must also be positive with respect to the source electrode. As a rule, the source electrode is ohmically connected to the semiconductor body.

In the circuit shown, the gate or control electrodes *g* of the transistors 1 and 2 are cross-connected to drain electrodes *d*. The control electrodes *g* are also connected through high-resistivity resistors 3 and 4, respectively, to terminals 5 and 6 of a supply voltage source, the source electrodes of the transistors 1 and 2 being connected to voltage points 7 and 8 respectively. A voltage of, for example, −10 volts is applied to point 5, a voltage of +10 volts to point 6, a voltage of −5 volts to point 7 and a voltage of +5 volts to point 8. The potential difference between the points 7 and 8 is therefore considerably less than the potential difference between the points 5 and 6. It is also possible, for example, to connect one of the terminals 5 or 8, for example terminal 5, to earth and derive the voltages at the points 7 and 8 from the supply voltage between the points 5 and 6. To this end, it may be sufficient to include a Zener diode between the points 5, 7 as well as between the points 6, 8. The Zener diode will have the required voltage drop at the said small leakage current. The Zener diodes may be formed as suitable p-n type junctions in the crystal elements 1 and 2 themselves, for example, by connecting the electrodes 7 and 8 to ohmic contacts on the semiconductor bodies *p* and *n* respectively, which, with their highly doped zones connected to the source electrodes *s*, exhibit the desired Zener breakdown voltage.

The devices operates as follows:

In one condition of the storage device, the transistors pass a leakage current which, as measured between the source and drain electrodes, is only very low and corresponds to that of a p-n junction operated in its cut-off direction. The resistors 3 and 4 are so proportioned that the said leakage current causes a voltage drop across them which is less than the potential difference between the points 5, 7 and 6, 8 respectively. The control electrode *g* of transistor 1 thus remains negatively biased and that of transistor 2 positively biased with respect to the associated source electrode *s*. The transistors thus remain in their cut-off condition. The transistor 2 is made conducting by applying a negative voltage pulse to an input terminal 9 connected to the control electrode of transistor 2 (it is also possible to apply a positive pulse, for example, to a terminal 10 connected to the control electrode of transistor 1) so that the voltage at the control electrode of transistor 1 is also varied so that this transistor becomes conducting and the voltage at the control electrode of transistor 2 is thus shifted so that the conducting state of the two transistors is retained. In other words: while initially cut-off voltages were active between the control and source electrodes of the transistors due to the voltages between the points 5, 7 and 6, 8 respectively, the supply of the said voltage pulse has caused a variation so that the transistors become conducting. However, the current which flows in this condition is still of the order of magnitude of the above-mentioned leakage current and hence extremely low since the values of the resistors 3 and 4, respectively, may be approximately equal to the internal resistance between the source and drain electrodes of the transistors in their cut-off condition. In practice, it has been found possible to use resistors of 1 megohm and higher so that the said currents may be limited to a few microamps.

However, due to this change-over from one storage condition to the other, a considerable voltage jump occurs at the output electrode 10—a jump from approximately −6 volts to +5 volts under the above-mentioned conditions—which voltage jump may be used to perform further operations such as the switching of further storage elements. The current required therefor may assume a considerable value, if necessary, since the transistor 2, which is in its conducting state, constitutes a low impedance for said current. Although the storage element thus hardly consumes current in both rest conditions it is still capable of supplying great currents for switching purposes and this enhances rapid switching. Due to this loadability with current, a property is obtained which makes the storage device according to the invention preferable to conventional storage circuits with magnetic cores in which the output current obtained must still be amplified.

To restore the circuit to its initial condition, a pulse of opposite polarity may be applied to one of the control electrodes *g* and hence, for example, a positive pulse to the input terminal 9. Since the transistor 1 is initially still conducting, it is then desirable to include a separating resistor 11 between the control electrode *g* of transistor 2 and the lead connecting the drain electrode *d* of transistor 1 and the resistor 4, in order that this pulse need provide substantially no current. For similar reasons, a resistor 12 may be connected to the control electrode of transistor 1. Reading in and restoring may then be effected, for example, through the terminals 9 and/or 9′ and reading out through the terminals 10 and/or 10′. A change-over of the first storage element will also result in a change-over of the other storage elements by connecting, for example, the terminal 10 (or 10′) to the terminal 9 (or 9′) of subsequent storage elements of similar structure (shown in broken line). The two output terminals 10 and 10′ thus make it possible to establish a low-resistivity connection either to the positive voltage point 8 or to the negative voltage point 7, a judicious use of rectifiers between the terminals 10 and 10′ and the equipment to be switched alternatively enabling, if desired, to use both connections without causing a short-circuit. The resistors 11 and 12 are again of the same order of magnitude as the resistors 3 and 4.

It has hitherto been found impossible in practice to obtain similar effects with transistors of a type other than field-effect transistors. Field-effect transistors having an insulated control electrode are preferred to those having a control electrode formed by a p-n junction in the semiconductor crystal since in the latter case a greater leakage current occurs, despite higher cut-off voltages at the control electrodes.

What is claimed is:

1. A storage device comprising, a pair of field-effect transistors of opposite conductivity type each having a source, drain, and insulated control electrode, first and second voltage sources, first means including a first impedance approximately equal to the internal resistance between the source and drain electrodes of each field-effect transistor in the cut-off direction for connecting said first voltage source to one transistor control electrode to bias the said one transistor control electrode in the cut-off direction, second means including a second impedance approximately equal to the internal resistance between the source and drain electrodes of each field-effect transistor in the cut-off direction for connecting said second voltage source to the other transistor control electrode to bias the said other transistor in the cut-off direction, third means for connecting the drain electrode of said one transistor to the control electrode circuit of said other transistor, fourth means for connecting the drain electrode of said other transistor to the control electrode of said one transistor, third and fourth voltage sources having a potential difference less than the pottential difference of the said first and second voltage sources each connected to a different one of the source electrodes of said transistors, input means connected to the control electrode of one of said transistors for applying an input signal thereto of a polarity and magnitude sufficient to change the conduction state of each of said transistors, and output means connected to the drain electrode of at least one of said transistors for providing an indication of the conduction state of the transistors.

2. A logic circuit having conduction and non-conduction states and comprising at least two storage devices each of which includes, a pair of field-effect transistors of opposite conductivity types each having a source, drain and insulated control electrode, first and second voltage sources, first means having an impedance limiting current flow therethrough during conduction to a current of approximately the same order of magnitude as flows during non-conduction and connecting said first voltage source to one transistor control electrode to bias the said electrode in a current direction opposing the normally conducting direction of said one transistor, second means having an impedance limiting current flow therethrough during conduction to a current of approximately the same order of magnitude as flows during non-conduction and connecting said second voltage source to the other transistor control electrode to bias the electrode in a current direction oppositing the normally conducting direction of said other transistor, third means for connecting the drain electrode of said one transistor to the control electrode of said other transistor, fourth means for connecting the drain electrode of said other transistor to the control electrode of said one transistor, third and fourth voltage sources having a potential difference less than the voltage of said first and second voltage sources each connected to a different one of the source electrodes of said transistors, input means connected to at least one of said control electrodes and applying a signal thereto for regulating the current carrying capacity of said transistor in response to signals applied to said input means, output means connected to at least one of said drain electrodes for providing a signal indicative of the current carrying state of the transistors, and means interconnecting selected input and output means of adjacent storage devices.

3. A storage device comprising a pair of field-effect transistors of opposite conductivity type each having an output electrode, an insulated control electrode, and a source electrode, said output and control electrodes being cross-connected, a supply voltage source, means including high ohmic valued resistors connecting the control electrodes to the voltage source for biasing the control electrodes of each said transistors in a current direction opposing the normally conducting direction of said transistors, means connecting the source electrodes to said voltage source to provide a potential difference between said source electrodes less than the supply source voltage, and output means connected to at least one of the said cross-connections.

References Cited

UNITED STATES PATENTS

| | | | |
|---|---|---|---|
| 2,770,728 | 11/1956 | Herzog | 307—88.5 |
| 3,121,802 | 2/1964 | Palmer | 307—88.5 |
| 3,145,308 | 8/1964 | Gindi | 307—88.5 |

ARTHUR GAUSS, *Primary Examiner.*

J. ZAZWORSKY, *Assistant Examiner.*

U.S. Cl. X.R.

307—303, 238, 304, 288